(12) United States Patent
Aruga et al.

(10) Patent No.: US 9,063,398 B2
(45) Date of Patent: Jun. 23, 2015

(54) PROJECTOR AND CONTROL METHOD FOR THE PROJECTOR

(71) Applicant: SEIKO EPSON CORPORATION, Tokyo (JP)

(72) Inventors: Tadanori Aruga, Torrance, CA (US); Yutaka Yasuda, Matsumoto (JP); Toru Katahira, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 13/905,585

(22) Filed: May 30, 2013

(65) Prior Publication Data

US 2013/0321781 A1 Dec. 5, 2013

(30) Foreign Application Priority Data

Jun. 4, 2012 (JP) ................................. 2012-127089

(51) Int. Cl.
*G03B 21/26* (2006.01)
*G03B 21/14* (2006.01)
*H04N 9/31* (2006.01)

(52) U.S. Cl.
CPC ............ *G03B 21/142* (2013.01); *H04N 9/3185* (2013.01); *H04N 9/3147* (2013.01)

(58) Field of Classification Search
CPC ...... G03B 21/10; G03B 21/14; H04N 9/3147; H04N 9/3182; H04N 9/3197
USPC ............. 353/69–70, 94; 348/743–747; 349/5, 349/7–9
See application file for complete search history.

(56) References Cited

U.S. PATENT DOCUMENTS

| | | | |
|---|---|---|---|
| 8,523,366 B2 * | 9/2013 | Takahashi | ........................ 353/69 |
| 2001/0013843 A1 | 8/2001 | Fujiwara et al. | |
| 2007/0058140 A1 * | 3/2007 | Kobayashi et al. | ............. 353/94 |
| 2008/0042922 A1 * | 2/2008 | Miyazawa | ..................... 345/1.2 |
| 2009/0184924 A1 * | 7/2009 | Uchida | ........................... 345/157 |
| 2011/0242493 A1 * | 10/2011 | Kotani | ............................ 353/30 |

FOREIGN PATENT DOCUMENTS

| | | |
|---|---|---|
| JP | A-2000-338941 | 12/2000 |
| JP | A-2008-170653 | 7/2008 |
| JP | A-2012-019442 | 1/2012 |

* cited by examiner

*Primary Examiner* — Sultan Chowdhury
(74) *Attorney, Agent, or Firm* — Oliff PLC (57) ABSTRACT

A projector that performs projection in cooperation with another projector, the projector including a determining unit configured to determine an operation state of the other projector and a control unit configured to control the projector to shift to, when the determining unit determines that the operation state of the other projector is not a normal operation state, a limited operation mode for limiting execution of at least a part of functions.

15 Claims, 3 Drawing Sheets

PROJECTOR AND CONTROL METHOD FOR THE PROJECTOR

CROSS-REFERENCE

The entire disclosure of Japanese Patent Application No. 2012-127089 filed on Jun. 4, 2012, which is hereby incorporated by reference in its entirety.

BACKGROUND

1. Technical Field

The present invention relates to a projector that projects an image on a projection surface and a control method for the projector.

2. Related Art

There has been known a projection system that projects an identical image in a stacked manner using a plurality of projectors to thereby improve the brightness of a projected image projected on a projection surface (see, for example, JP-A-2000-338941 (Patent Literature 1)). In the projection system of this type, the plurality of projectors are serially connected. One projector that receives commands representing all the projectors transmits a necessary command to the other projectors. In general, the projection system performs control for disabling user operation for the projectors other than the projector that receives commands.

However, when the projector that receives commands cannot perform normal operation because, for example, some abnormality occurs in the projector, even if the other projectors are normally operating, the projection system cannot receive operation by a user and operate.

SUMMARY

An advantage of some aspects of the invention is to provide a projector that performs projection in cooperation with another projector, the projector being capable of operating according to operation by a user even when an abnormality occurs in the other projector, and a control method for the projector.

An aspect of the invention is directed to a projector that performs projection in cooperation with another projector. The projector includes: a determining unit configured to determine an operation state of the other projector; and a control unit configured to control the projector to shift to, when the determining unit determines that the operation state of the other projector is not a normal operation state, a limited operation mode for limiting execution of at least a part of functions.

According to the aspect of the invention, when the operation state of the other projector is not the normal operation state, for example, when an abnormality occurs, execution of a specific function is limited. The function to be limited is, for example, a function that causes inconsistency of operation states of a plurality of projectors. Therefore, with the projector according to the aspect of the invention, when the operation state of the other projector is not the normal operation state, a function can be executed according to operation by a user and the function to be executed is limited. Therefore, for example, inconsistency of operation states between the projectors is not caused.

Another aspect of the invention is directed to the projector described above, wherein the control unit limits, in the limited operation mode, execution of a function that requires a projection state of the projector to be consistent with a projection state of the other projector.

According to the aspect of the invention, the projector that performs projection in cooperation with the other projector does not independently execute a function that requires a projection state of the projector to be consistent with a projection state of the other projector. Therefore, when the operation state of the other projector is not the normal operation state, even if the projector independently executes a function according to operation by a user, it is possible to thereafter resume stack display in a consistent projection state after the other projector returns to normal operation.

Still another aspect of the invention is directed to the projector described above, wherein the projector includes an operation detecting unit configured to detect operation by a remote controller, the control unit controls the projector to shifts to a sub-operation mode when the determining unit determines that the operation state of the other projector is the normal operation state, and in the sub-operation mode, even if the operation detecting unit detects the operation by the remote controller, the projector does not independently execute a function according to the operation.

According to the aspect of the invention, the projector that does not execute a function corresponding to operation of the remote controller when the other projector is in the normal operation state can execute the function according to operation by a user when the operation state of the other projector is not normal.

Yet another aspect of the invention is directed to the projector described above, wherein the control unit changes, in the limited operation mode, the function to be executed according to the operation by the remote controller to a function different from the function in the sub-operation mode.

According to the aspect of the invention, the projector that does not execute the function corresponding to the operation by the remote controller when the other projector is in the normal operation state shifts to, when the operation state of the other projector is not the normal operation state, the limited operation mode for receiving the operation by the remote controller. In the limited operation mode, the function executed according to the operation by the remote controller is different from a function in the normal operation state. Therefore, for example, it is possible to set the projector not to execute a function that the projector should not independently execute. Consequently, when the operation state of the other projector is not the normal operation state, the projector can operate according to operation by a user without executing an inappropriate function.

Still yet another aspect of the invention is directed to the projector described above, wherein in the limited operation mode, the control unit controls the projector to shifts to a stop state when the operation detecting unit detects predetermined operation of the remote controller other than power supply operation.

According to the aspect of the invention, in the limited operation mode, it is possible to shift the projector to the stop state of a power supply for the projector according to operation other than the power supply operation of the remote controller. Therefore, a user does not perform the power supply operation. Consequently, when the power supply operation of the remote controller is performed in the limited operation mode, it is possible to prevent the projector that receives a signal transmitted by the remote controller from being started up or stopped.

Further another aspect of the invention is directed to the projector described above, wherein the projector includes a notifying unit configured to notify the shift to the stop state when the operation detecting unit detects the predetermined operation of the remote controller.

According to the aspect of the invention, since the notifying unit informs the operation for shifting the projector to the power supply stop state in the limited operation mode, it is possible to realize improvement of usability.

Still further another aspect of the invention is directed to the projector described above, wherein the control unit shifts to a stop state when, at the start of projection, the determining unit determines that the operation state of the other projector is not the normal operation state.

According to the aspect of the invention, when the operation state of the other projector is not the normal operation state before the start of the projection, since the control unit does not shift the projector to the limited operation mode, it is possible to quickly take measures such as restart of an entire system.

Yet further another aspect of the invention is directed to a control method for a projector for controlling the projector to execute projection in cooperation with another projector. The control method includes: determining an operation state of the other projector; and shifting to, when it is determined that the operation state of the other projector is not a normal operation state, a limited operation mode for limiting execution of at least a part of functions.

According to the aspect of the invention, when the operation state of the other projector is not the normal operation state, for example, when an abnormality occurs, execution of a specific function is limited. The function to be limited is, for example, a function that causes inconsistency of operation states of a plurality of projectors. Therefore, with the control method for the projector according to the aspect of the invention, when the operation state of the other projector is not the normal operation state, a function can be executed according to operation by a user and the function to be executed is limited. Therefore, for example, inconsistency of operation states between the projectors is not caused.

According to the aspects of the invention, in a configuration in which a projector performs projection in cooperation with another projector, when an operation state of the other projector is not a normal operation state, the projector can execute a function according to operation by a user and, for example, inconsistency of operation states between the projectors is not caused.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment to which the invention is applied is explained below with reference to the accompanying drawings.

Figure 1:
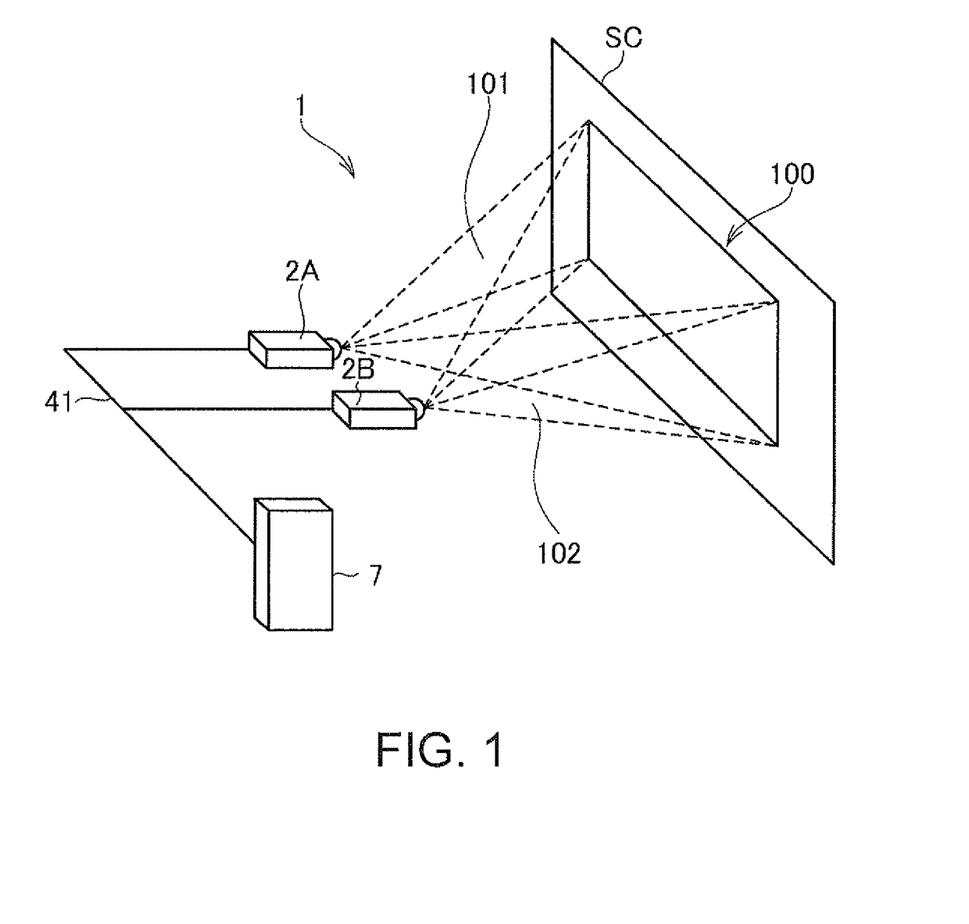
FIG. 1 is a diagram showing a schematic configuration of an image display system according to an embodiment.

FIG. 1 is a diagram showing a schematic configuration of a projection system 1 according to the embodiment of the invention.

In the projection system 1, a projector (another projector) 2A and a projector 2B are set side by side. Stack display is performed to superimpose projected images 101 and 102 projected by the two projectors 2A and 2B on a screen SC (a projection surface). In FIG. 1, a configuration in which the projectors 2A and 2B are set side by side horizontally is shown as an example. The projectors 2A and 2B may be set side by side vertically. The projectors 2A and 2B may be set to be placed on the floor in front of the screen SC (placed on a table) or may be set to be suspended from the ceiling.

The projectors 2A and 2B are connected to an image output apparatus 7 via an image transmission cable 41. The projectors 2A and 2B respectively project images based on image data input from the image output apparatus 7 on the screen SC. Image data concerning an identical image is supplied to the projectors 2A and 2B from the image output apparatus 7.

The projection system 1 projects the same images respectively from the projectors 2A and 2B to the screen SC. Projected images 101 and 102 are superimposed and focused on the screen SC as one projected image 100. That is, the projected image 100 is an image obtained by projecting projected lights of the respective projectors 2A and 2B to be stacked one on top of the other. There is an advantage that a light amount of the projected image 100 can be substantially increased by performing this stack display.

Figure 2:
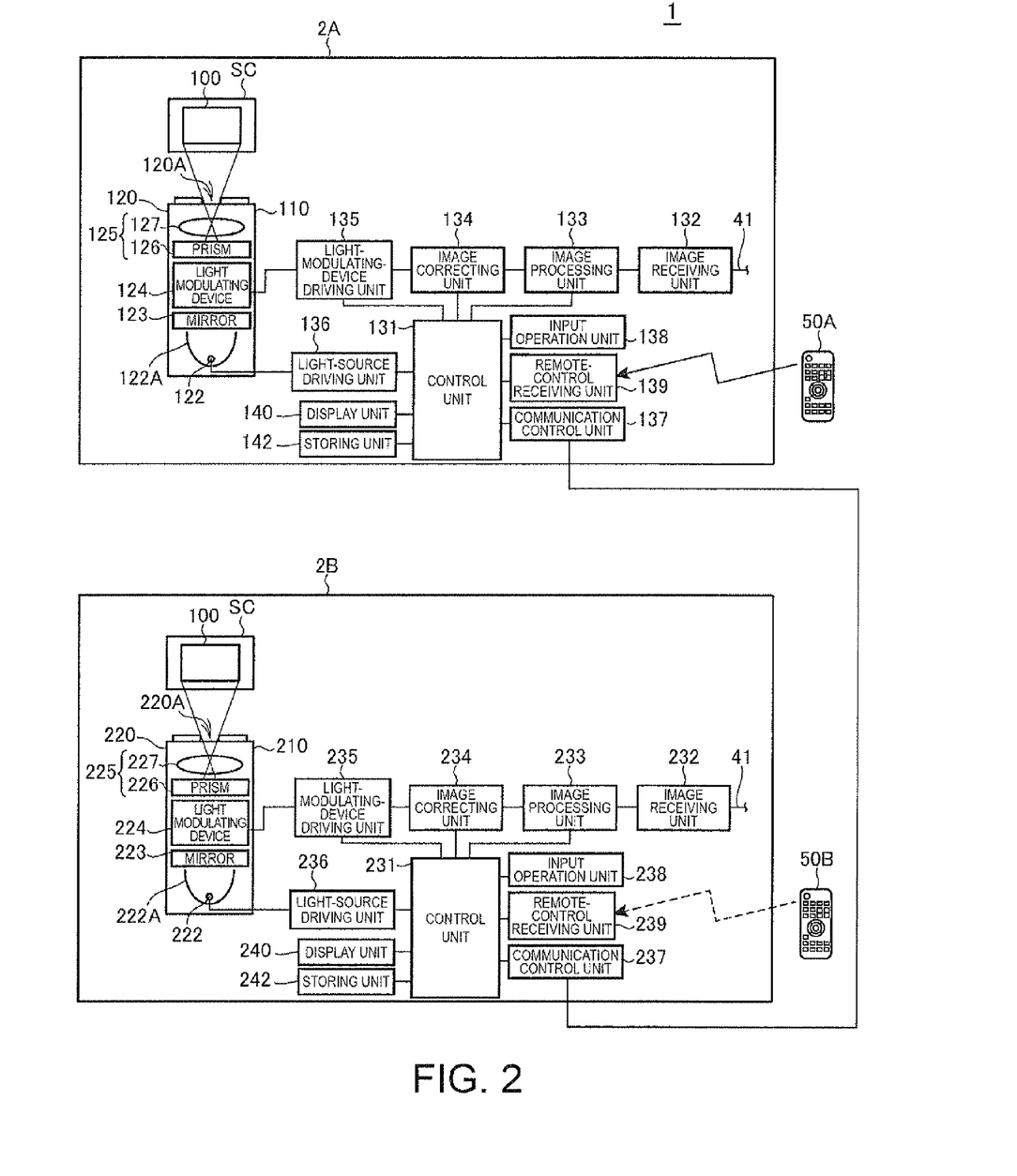
FIG. 2 is a diagram showing functional configurations of two projectors.

FIG. 2 is a diagram schematically showing functional configurations and hardware configurations of the projectors 2A and 2B included in the projection system 1.

The projector 2A includes, in a main body 120, an image projecting unit 110 configured to project an image, a control unit 131 configured to perform image processing and control units of the projector 2A, an image receiving unit 132, an image processing unit 133, an image correcting unit 134, a light-modulating-device driving unit 135, a light-source driving unit 136, a communication control unit 137, an input operation unit 138, a remote-control receiving unit (an operation detecting unit) 139, a display unit (a notifying unit) 140, and a storing unit 142.

The image projecting unit 110 includes a light source 122 including a reflector 122A, a mirror 123 configured to separate light emitted by the light source 122 into color lights of a R component, a G component, and a B component, a light modulating device 124 functioning as a modulating unit configured to modulate the color lights of the R component, the G component, and the B component separated by the mirror 123, and a projection optical system 125 configured to project the light modulated by the light modulating device 124 to the screen SC. In the main body 120, a cooling fan 122B functioning as a cooling unit configured to cool the light source 122 and a control substrate of the control unit 131 is provided.

As the light source 122, for example, a Xenon lamp, an extra-high pressure mercury lamp, an LED, or a laser light source can be used. The light source 122 may include, besides the reflector 122A, a lens group (not shown in the figure) for improving an optical characteristic of projected light, a sheet polarizer, and an auxiliary reflector (not shown in the figure).

The mirror 123 includes a dichroic mirror for R configured to reflect light of the R component included in the light emitted by the light source 122 and transmit lights of the G component and the B component and a dichroic mirror for G configured to reflect the light of the G component and transmit the light of the B component. A relay lens group configured to absorb a difference between optical path lengths of the R component, the G component and the B component may be provided in the mirror 123.

The light modulating device 124 is equivalent to a modulating unit configured to display an image on the screen SC. The light modulating device 124 includes a light modulating device configured to modulate the light of the R component, a light modulating device configured to modulate the light of the G component, and a light modulating device configured to modulate the light of the B component.

More specifically, the light modulating device 124 adopts a system in which three transmissive or reflective liquid crystal light valves corresponding to the colors of RGB are used or a system in which three digital mirror devices are used. The light modulating device 124 modulates the lights of the R component, the G component, and the B component separated by the mirror 123.

The mirror 123 can be configured to guide the light emitted by the light source 122 to the light modulating device 124 while keeping the light as white light without separating the light into the color lights. In this case, the light modulating device 124 adopts a DMD system in which a color wheel configured to transmit lights of RGB among lights included in the white light emitted by the light source 122 and one digital mirror device (DMD) are combined. In the system in which the color wheel and the one digital mirror device are combined, one digital mirror device is equivalent to the modulating unit.

In this embodiment, the light modulating device 124 is configured using the liquid crystal light valves. The light modulating device 124 includes a transmissive liquid crystal panel in which a plurality of pixels are arranged in a matrix shape. The light modulating device 124 functions as a modulating unit configured to form an image using the plurality of pixels and modulate the light emitted by the light source 122 using the formed image.

The light modulating device 124 is driven by the light-modulating-device driving unit 135 explained below to change the transmittance of the light in the pixels arranged in the matrix shape to thereby form an image.

The projection optical system 125 includes a prism 126 configured to combine modulated lights of the three colors of RGB modulated by the light modulating device 124 and a projection lens 127 configured to focus the projected image 100 combined by the prism 126 on the screen SC. The prism 126 is configured by combining one or a plurality of optical prisms and mirrors according to the configuration of the light modulating device 124.

The light modulating device 124 according to this embodiment includes the three transmissive liquid crystal panels. Therefore, the prism 126 is configured to combine lights modulated by the three liquid crystal panels. The projection lens 127 includes, for example, a plurality of lens groups. The projection lens 127 is driven by a driving mechanism (not shown in the figure) configured to adjust zooming and focusing. Light projected by the projection optical system 125 is projected on the screen SC from a projection window 120A. The projected image 100 is displayed on the screen SC.

The control unit 131 includes a not-shown CPU, a ROM having stored therein, in a nonvolatile manner, programs to be executed by the CPU, data to be processed by the CPU, and the like, and a RAM that temporarily stores programs to be executed by the CPU and data to be processed by the CPU. The control unit 131 centrally controls the units of the projector 2A.

The image transmission cable 41 is connected to the image receiving unit 132. The image receiving unit 132 receives image data (image signals) of various forms from the external image output apparatus 7 via the image transmission cable 41. The image data received by the image receiving unit 132 may be either an analog image signal or digital image data. A signal form, a data format, and the like are arbitrary. Specific specifications of a connection terminal to which the image transmission cable 41 is connected in the image receiving unit 132, the image transmission cable 41, and the image output apparatus 7 are also arbitrary. The image receiving unit 132 outputs the image data received from the image output apparatus 7 to the image processing unit 133.

The image processing unit 133 analyzes, according to the control by the control unit 131, image data input from the image receiving unit 132, performs analog/digital conversion processing, resolution conversion processing, aspect ratio changing processing, frame rate conversion processing, subtractive color processing, additive color processing, image correction processing, and the like set in advance according to a data format of the image data, and generates projected image data having resolution corresponding to the number of display pixels of the light modulating device 124.

The image correcting unit 134 executes trapezoidal distortion correction processing for correcting trapezoidal distortion caused by a tilt angle of the projector 2A with respect to the screen SC. The image correcting unit 134 executes, according to the control by the control unit 131, correction processing for correcting the projected image data output by the image processing unit 133 into a shape for compensating for trapezoidal distortion and outputs the projected image data after the correction to the light-modulating-device driving unit 135. In the correction processing, for example, an image formation region having a shape set by the user to compensate for trapezoidal distortion is set in a pixel region of the liquid crystal panel of the light modulating device 124. The projected image data is processed to fit in the image formation region.

The light-modulating-device driving unit 135 drives the light modulating device 124 according to image data input from the image correcting unit 134. Consequently, the projected image 100 is projected in the image formation region having the shape set by the user.

The light-source driving unit 136 performs lighting control for the light source 122 on the basis of an instruction of the control unit 131.

The communication control unit 137 transmits and receives control information to and from the projector 2B. The projection system 1 includes the projector 2A as a commander configured to receive a command for controlling the units of the projection system 1. The projector 2A is configured to be capable of controlling the projector 2B by transmitting, using the communication control unit 137, a necessary command to the projector 2B that functions as a receiver.

The input operation unit 138 includes a plurality of operation keys (not shown in the figure) and the like operable by the user to give various instructions to the projector 2A. Examples of the operation keys included in the input operation unit 138 include a power key for switching ON and OFF of a power supply, a menu key for displaying a menu image for performing various kinds of setting, a decision key for deciding an item selected on the menu image or the like, a position adjustment key for instructing projection of a position adjustment pattern, four direction keys corresponding to the upward, downward, left, and right directions, and a trapezoidal distortion correction key used for trapezoidal distortion correction. The control unit 131 detects content of operation by the user in the input operation unit 138 and controls the projector 2A on the basis of the detected operation content.

The remote-control receiving unit 139 receives various instructions to the projector 2A input to a remote-controllable remote controller 50A by the user. Like the input operation unit 138, the remote controller 50A includes a plurality of operation keys such as a power key for switching ON and OFF of a power supply, a menu key for displaying a menu image for performing various kinds of setting, a decision key for deciding an item selected on the menu image or the like, a position adjustment key for instructing projection of a position adjustment pattern, four direction keys corresponding to the upward, downward, left, and right directions, and a trapezoidal distortion correction key used for trapezoidal distortion correction.

The remote-control receiving unit 139 and the remote controller 50A are respectively configured to be capable of setting reception and transmission channels. When channels of the remote-control receiving unit 139 and channels of the remote controller 50A are set to the same channels, the remote-control receiving unit 139 can receive operation by the user input to the remote controller 50A. When the projector 2B is set in the vicinity of the projector 2A and channels of a remote controller 50B for operating the projector 2B are set to channels different from the channels of the remote-control receiving unit 139, the projector 2A can be prevented from being actuated by the remote controller 50B.

The display unit 140 includes a display panel configured by, for example, a liquid crystal display panel or an organic EL display panel called OLED (Organic Light-Emitting-Diode), OEL (Organic Electro-Luminescence), or the like. Under the control by the control unit 131, the display unit 140 drives the display panel and displays various images. The input operation unit 138 may be arranged to be placed on the display panel of the display unit 140 and configured to receive user operation through contact operation on a touch screen.

The storing unit 142 stores password-related information in which at least a regular password set in advance is described.

When a power supply for the projector 2A is turned on by operation detected by the input operation unit 138 or operation detected by the remote-control receiving unit 139, the control unit 131 causes the display unit 140 to display a password input screen and urges the user to input a password. The control unit 131 performs authentication to determine whether the password input by the user and the password registered in the storing unit 142 in advance coincide with each other. When the password input by the user is not authenticated, the control unit 131 shifts an operation state of the projector 2A to a state of password lock. In the state of password lock, functions to be executed by the projector 2A are limited. Specifically, the projector 2A can execute only operation for power-off. The control unit 131 may be configured to shift the projector 2A to the state of password lock when failing in the authentication of the password continuously a predetermined number of times or more.

The projector 2B includes, in a main body 220, an image projecting unit 210 configured to project an image, a control unit (a determining unit or a control unit) 231 configured to perform image processing and control units of the projector 2B, an image receiving unit 232, an image processing unit 233, an image correcting unit 234, light-modulating-device driving unit 235, a light-source driving unit 236, a communication control unit 237, an input operation unit 238, a remote-control receiving unit (an operation detecting unit) 239, a display unit (a notifying unit) 240, and a storing unit 242. The configurations of the units of the projector 2B are the same as the configurations of the units of the projector 2A. Explanation of the configurations of the units of the projector 2B is omitted.

The projector 2B operates as a receiver configured to receive a control command from the projector 2A using the communication control unit 237. When the projector 2B independently performs projection, the projector 2B executes various functions according to operation detected by the input operation unit 238 and operation by the remote controller 50B received via the remote-control receiving unit 239. When the projector 2B operates as the receiver of the projector 2A, which is the commander, the projector 2B operates in a sub-operation mode. In the sub-operation mode, the projector 2B does not respond to operation by the user detected by the input operation unit 238 and operation by the user detected by the remote-control receiving unit 239. That is, when the user operates the projector 2A and the projector 2A outputs a command according to the operation, the projector 2B in the sub-operation mode operates according to the command.

When the two projectors 2A and 2B are arranged close to each other, both the two projectors 2A and 2B receive infrared signals transmitted by the remote controllers 50A and 50B, i.e., interference could occur. In order to prevent the interference, for example, it is possible to adopt a configuration in which different channels are respectively allocated to the two projectors 2A and 2B and the two remote controllers 50A and 50B and one projector detects only an infrared signal emitted by one remote controller. For example, when a channel 1 is allocated to the remote controller 50A and the projector 2A and a channel 2 is allocated to the remote controller 50B and the projector 2B, the projector 2A reacts to only operation of the remote controller 50A and the projector 2B reacts to only operation of the remote controller 50B. In this configuration, when the projector 2B operates in the sub-operation mode, the projector 2B does not respond to operation of the remote controller 50B.

When power-on of the projector 2A is instructed by operation by the user and the projector 2A transmits a control command for turning on a power supply to the projector 2B, the projector 2B receives the command and the power supply is turned on. After the power supply is turned on, until the projector 2B receives a control command for password lock release from the projector 2A, the projector 2B maintains a state of the password lock. When a password is authenticated by the control unit 131, the projector 2A transmits the control command for password lock release to the projector 2B using the communication control unit 137. When the projector 2B receives the control command, an operation state of the projector 2B shifts to a state in which the projector 2B can execute various kinds of functions on the basis of a control command from the projector 2A.

When an abnormality occurs in the projector 2A, which is a commander, the projector 2A shifts to an abnormal standby state. Examples of the abnormality of the projector 2A include an abnormality in which the temperature on the inside of the projector 2A exceeds a setting value (a high-temperature abnormality), an abnormality of a lamp included in the light source 122 (a lamp abnormality), and a hardware abnormality including a failure of a cooling fan and an abnormality of a temperature sensor and include an abnormality due to a problem of software executed by the CPU of the control unit 131.

The abnormal standby state is an operation state for preventing, for example, a failure due to an abnormality that occurs in the projector 2A and making it easy to deal with the abnormality. The abnormal standby state is different from a normal operation state. In the abnormal standby state, in the projector 2A, operations such as extinguishing of the light source 122, a stop of rendering of the liquid crystal light valves included in the light modulating device 124, continuation of cooling by the cooling fan, and a stop of power supply from a power supply unit (not shown in the figure) to the units including the light source 122 are executed according to the control by the control unit 131. In the abnormal standby state, functions such as a response to a state check command input from an external apparatus (not shown in the figure) connected to the communication control unit 137 and lighting/blinking of an LED for informing an abnormality can be executed. However, the projector 2A is restricted not to execute functions such as projection. The abnormal standby state is an operation state different from a power-off state.

In the abnormal standby state, the projector 2A does not carry out control corresponding to operation detected by the input operation unit 138 and operation of the remote controller 50A detected by the remote-control receiving unit 139. When the projector 2A shifts to the abnormal standby state while the projector 2B is operating in the sub-operation mode, both the projectors 2A and 2B stop receiving operation by the remote controllers 50A and 50B and the input operation units 138 and 238. The user needs to wait until the projector 2A returns from the abnormal standby.

In this embodiment, when the projector 2A, which is the commander of the projection system 1, shifts to the abnormal standby state, the user is enabled to operate the projector 2B.

Figure 3:
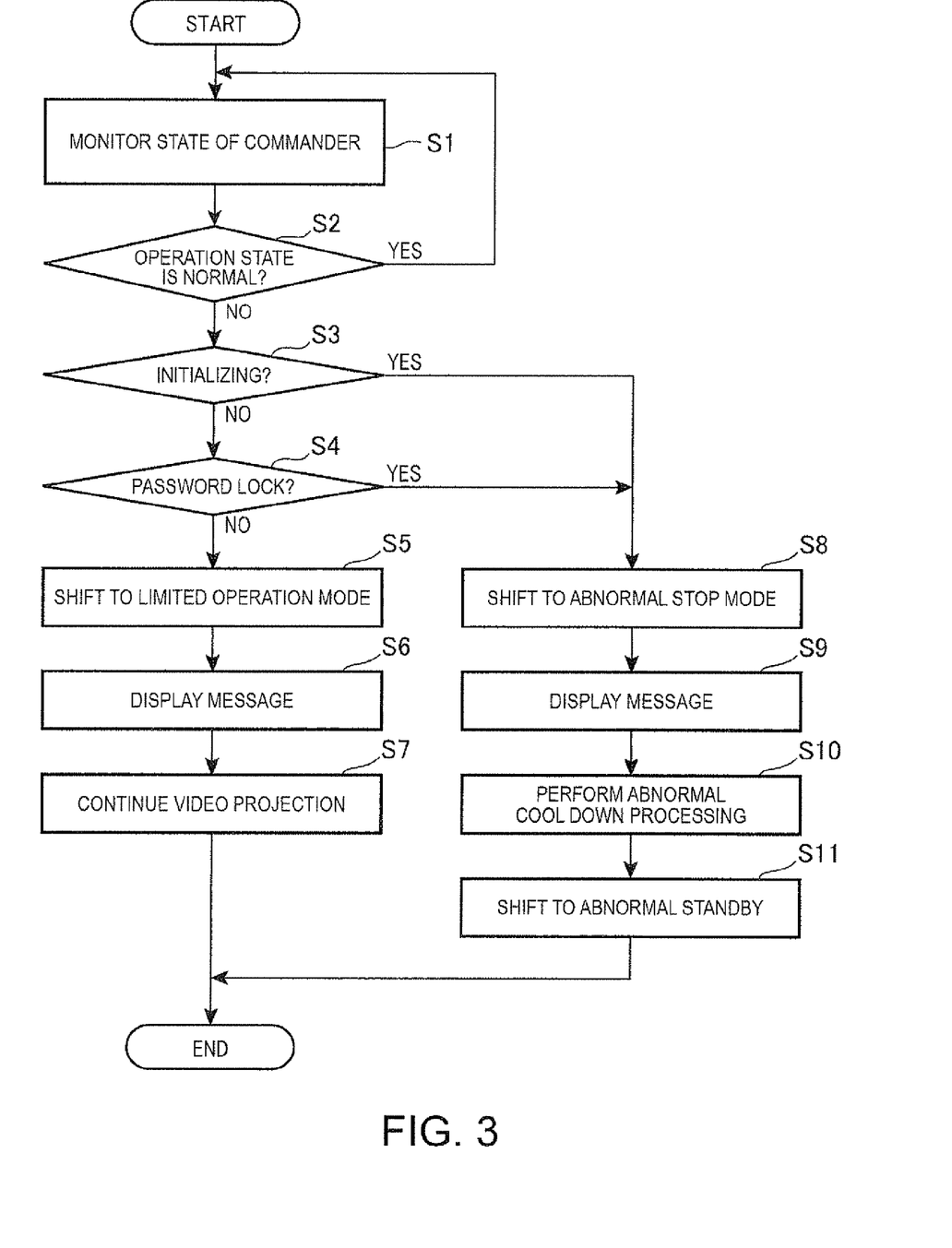
FIG. 3 is a flowchart for explaining the operation of the projectors.

FIG. 3 is a flowchart for explaining the operation of the projection system 1, in particular, the operation of the projector 2B.

After the power supply is turned on according to a control signal input from the projector 2A, the projector 2B continuously monitors, using the control unit 231, an operation state of the projector 2A, which is the commander, (step S1). The projector 2B determines whether an operation state of the projector 2A is normal (a normal operation state) (step S2).

As a method in which the projector 2B determines whether the operation state of the projector 2A is normal, a plurality of methods can be used as appropriate. For example, when the projector 2A detects abnormality occurrence by itself and transmits an abnormality occurrence signal to the projector 2B, the projector 2B receives the abnormality occurrence signal to determine that the operation state of the projector 2A is abnormal (is not the normal operation state). Further, for example, the projector 2B may be configured to periodically perform transmission and reception of a control signal with the projector 2A and determine, when the reception of the signal from the projector 2A stops for a predetermined time or more, that the operation state of the projector 2A is abnormal.

Alternatively, the projector 2B may be configured to be capable of detecting, using the remote-control receiving unit 239, an infrared signal transmitted by the remote controller 50A. The projector 2B may determine whether operation by the user indicated by the infrared signal transmitted from the remote controller 50A and content of a control signal transmitted from the projector 2A, which receives the infrared signal, coincide with each other. In this case, if an instruction indicated by the infrared signal transmitted from the remote controller 50A and the control signal transmitted to the projector 2B by the projector 2A do not coincide with each other, the projector 2B can determine that the projector 2A is not normally operating. For example, when a control command for changing a slide to the next page is not transmitted from the projector 2A to the projector 2B although the user instructs a change of the slide to the next page by operating the remote controller 50A, the projector 2A is not considered to be normally operating. With this configuration example, not only when the projector 2A is in the abnormal standby state but also when a failure occurs in a part of the functions of the projector 2A because of a software abnormality of the projector 2A, it is possible to accurately detect this abnormality.

When determining that the operation state of the projector 2A is not normal (No in step S2), the control unit 231 determines whether an operation state of the projector 2B is initializing operation (step S3). The initializing operation is a series of operation executed until projection is enabled after a power supply for the projector 2B is turned on. When determining that the operation state of the projector 2B is not the initializing operation (No in step S3), subsequently, the control unit 231 determines whether the operation state of the projector 2B is password lock, i.e., the projector 2B does not yet receive a control signal for password lock release from the projector 2A (step S4). When determining that the operation state of the projector 2B is not the password lock (No in step S4), the control unit 231 shifts to a limited operation mode for limiting an operation mode of the projector 2B (step S5).

The limited operation mode is explained in detail. The limited operation mode is an operation mode in which the projector 2B executes functions in response to operation of the remote controllers 50A and 50B and the input operation unit 238. As explained above, when the projector 2A shifts to the abnormal standby state, both the projectors 2A and 2B stop detecting operation. Therefore, it is desirable to enable the projector 2B to independently operate according to operation by the user. However, if the projector 2B independently executes all the functions, there is a concern that an undesirable state occurs. For example, only the projector 2B executes trapezoidal distortion correction or barrel (pincushion) distortion correction and shapes of projected images of the projectors 2A and 2B do not coincide with each other. Therefore, in the limited operation mode, the projector 2B is enabled to independently execute the functions and, on the other hand, execution of a part of the functions is limited to prevent the projector 2A from causing a deficiency when the projector 2A returns to the normal operation state.

When the projection system 1 performs stack projection, in general, it is assumed that the user often has only the remote controller 50A for operating the projector 2A, which is the commander. As in the example explained above, channels can be set in the projectors 2A and 2B and the remote controllers 50A and 50B. When a reception channel of the input operation unit 238 is set to a channel same as a reception channel of the remote controller 50A, the projector 2B does not detect operation by the remote controller 50A. Therefore, in such a case, in the limited operation mode, the control unit 231 enables the projector 2B to receive, using the remote-control receiving unit 239, an infrared signal transmitted by a remote controller (e.g., the remote controller 50A) set in a different channel. Consequently, in the limited operation mode, the projector 2B can detect the operation by the remote controller 50A. Therefore, the projector 2B can receive operation by the user in place of the projector 2A that shifts to the abnormal standby state.

In the limited operation mode, the control unit 231 is in a state in which the control unit 231 can detect operation by the user using the input operation unit 238 and the remote-control receiving unit 239 and respond to the detected operation. In the limited operation mode, the projector 2B cannot execute a part of the functions even if the execution of the functions is instructed by operation by the user. That is, functions executable by the projector 2B are limited. More specifically, the control unit 231 limits execution of, for example, functions affecting the shape and the size of a projected image on the screen SC such as barrel distortion correction and trapezoidal distortion correction and functions affecting the direction of a projected image such as a change of a setting mode (suspension from the ceiling or placement on the floor). If the projector 2B independently executes these functions while the projector 2A is in the abnormal standby state, inconsistency of projected images of the projectors 2A and 2B is caused. When the projector 2A returns from the abnormal standby state to the normal operation state, stack projection is affected. Therefore, in the limited operation mode, execution of these functions is limited. In the limited operation mode, execution of functions that one projector 2B alone cannot carry out such as a 3D projection function for projecting an image for the right eye and an image for the left eye using the projectors 2A and 2B and a position adjustment function for automatically adjusting a stack position of images may be limited.

Further, in the limited operation mode, operation of the remote controllers 50A and 50B for instructing power-off of the projector 2B is changed. Specifically, in the normal operation mode, operation for depressing power keys of the remote controllers 50A and 50B is operation for instructing power-off of the projector 2B. However, in the limited operation mode, power-off is instructed by operation of another key (e.g., a decision key). Therefore, the projector 2B is not turned off even if the power keys of the remote controllers 50A and 50B are depressed during the execution of the limited operation mode. Such a change of key allocation can be easily realized by, for example, the control unit 231 changing association of a control signal received by the remote-control receiving unit 239 and a function to be executed.

For example, when operation for executing power-off of the projector 2B is operation for depressing the power key once in the normal operation state, in the limited operation mode, a screen for confirming whether the power supply is actually turned off may be displayed after the power key is depressed once and the power supply may be turned off when the power key is depressed for the second time thereafter.

When the operation for instructing power-off in the limited operation mode is operation different from the operation in the normal operation state in this way, it is possible to prevent wrong operation for the projector 2A. That is, when the user desires to turn off the power supply of the projector 2B in the limited operation mode, it is likely that, when the power keys of the remote controllers 50A and 50B are operated, the projector 2A detects the operation and executes operation for returning from the abnormal standby state to the normal operation state. In this case, the projector 2A attempts to return to the normal operation and sometimes detects an abnormality and shifts to the abnormal standby state again. While the projector 2A is in the abnormal standby state, the user has to wait. If the operation for turning off the power supply for the projector 2B is changed, it is possible to surely shift only the projector 2B to power-off while keeping the projector 2A in the abnormal standby state.

The control unit 231 shifts the projector 2B to the limited operation mode. Subsequently, the control unit 231 displays a message indicating the limited operation mode on the display unit 240 of the projector 2B (step S6) and continues the image projection on the screen SC (step S7). In the message indicating the limited operation mode, a message indicating that an abnormality occurs in the projector 2A, a type of the abnormality detected by the projector 2A, an operation method for instructing power-off of the projector 2B in the limited operation mode, and the like may be displayed.

When determining the abnormality of the projector 2A during the initializing operation of the projector 2B (Yes in step S3), since it is likely that synchronization of the projector 2A and the projector 2B is not completed, the control unit 231 shifts the operation mode of the projector 2B to an abnormal stop mode (step S8).

When detecting the abnormality of the projector 2A during the password lock of the projector 2B (Yes in step S4), since it is likely that password authentication for the projector 2A is not completed, the control unit 231 shifts the operation mode of the projector 2B to the abnormal stop mode (step S8).

The abnormal stop mode is explained in detail. The abnormal stop mode is an operation mode in which the projector 2B executes only a part of functions such as a shift to power-off in response to operation of the remote controllers 50A and 50B and the input operation unit 238. As explained above, when the projector 2A shifts to the abnormal standby state, both the projectors 2A and 2B stop detecting operation. Therefore, it is desirable to enable the projector 2B to independently operate according to operation by the user. However, when an abnormality of the projector 2A is detected in steps S3 and S4 before the projector 2B shifts to the normal operation state, it is desirable not to enable the projector 2B to execute projection. Specifically, when an abnormality of the projector 2A is detected before the password lock of the projector 2A is released, it is undesirable to enable the projector 2B to execute projection because the projector 2B has not undergone authentication by a password. When an abnormality of the projector 2A is detected before the projector 2B completes the initializing operation, since the projector 2B has not undergone trapezoidal distortion correction, stack position adjustment, and the like, a projection state is not a satisfactory state even if only the projector 2B is enabled to execute projection. Therefore, in the abnormal stop mode, the control unit 231 receives only operation for turning off the power supply for the projector 2B and does not respond to operation for instructing execution of the other functions.

Further, the control unit 231 changes the operation for executing power-off of the projector 2B from the operation for depressing the power key to another operation.

The control unit 231 shifts the projector 2B to the abnormal stop mode. Subsequently, the control unit 231 displays a message indicating that the operation state is the abnormal stop mode on the display unit 240 of the projector 2B (step S9). In the message indicating the abnormal stop mode, a message indicating that the projector 2A is abnormal, a type of the abnormality of the projector 2A, an operation method for executing power-off of the projector 2B, and the like may be displayed together.

Subsequently, the control unit 231 executes abnormal cool down processing to make the operation state of the projector 2B consistent with the operation state of the projector 2A that is in the abnormal standby state (step S10). After the end of the abnormal cool down processing, the control unit 231 shifts the projector 2B to the abnormal standby state in the same manner as the projector 2A (step S11). In the abnormal cool down processing, as in cool down processing in turning off the power supply in the normal operation state, heated components such as a lamp included in a light source unit 222 are cooled by cooling means such as a not-shown cooling fan.

As explained above, with the projection system 1 according to the embodiment to which the invention is applied, the projector 2B that performs projection in cooperation with the projector 2A includes the control unit 231 configured to determine an operation state of the projector 2A. When determining that the operation state of the projector 2A is not the normal operation state, the control unit 231 shifts to the limited operation mode for limiting execution of at least a part of the functions. Consequently, when the projector 2A shifts to the abnormal standby state because, for example, an abnormality occurs in the projector 2A, the projector 2B shifts to a state in which the projector 2B can execute the functions irrespective of control of the projector 2A. Therefore, the user can operate the projector 2B instead of the projector 2A that is not in the normal operation state any more. Further, in the limited operation mode, execution of functions affecting a projection state when the projector 2A thereafter returns to the normal operation state, functions that one projector 2B alone cannot carry out, and the like is limited. Therefore, it is possible to apply only appropriate operation to the projector 2B.

In the limited operation mode, the control unit 231 limits execution of functions that require a projection state of the projector 2B to be consistent with a projection state of the other projector 2A. Consequently, execution of functions affecting a projection state of stack projection of the projection system 1, for example, causing inconsistency in the projection state when the projector 2A returns to the normal operation state is limited. Consequently, operation by the user for the projector 2B is enabled when the projector 2A shifts to the abnormal standby state. After the projector 2A returns to the normal operation state, stack display can be performed in a projection state same as a projection state before abnormality occurrence.

The projector 2B includes the remote-control receiving unit 239 configured to detect operation by the remote controllers 50A and 50B. When it is determined that the operation state of the projector 2A is the normal operation state, the control unit 231 executes the sub-operation mode for, even if operation by the remote controllers 50A and 50B is detected by the remote-control receiving unit 239, not independently executing functions according to the operation. Consequently, when the projector 2A is in the normal operation state, the projection system 1 causes the projector 2A to operate as the commander and causes the projector 2B to function as the receiver. Therefore, it is possible to synchronize the operations of the projectors 2A and 2B and cause the projectors 2A and 2B to execute stack display in a satisfactory state.

In the limited operation mode, the control unit 231 changes functions executed according to operation by the remote controllers 50A and 50B to functions different from functions in the sub-operation mode. Consequently, when the projector 2A shifts to the abnormal standby state, it is possible to enable the projector 2B to be operated by the operation by the remote controllers 50A and 50B and prevent operation that is likely to affect the operation of the projector 2A that is in the abnormal standby state.

In the limited operation mode, when predetermined operation of the remote controllers 50A and 50B other than power supply operation is detected by the remote-control receiving unit 239, the control unit 231 shifts to a stop state (a power-off state). Consequently, in the limited operation mode, it is possible to turn off the power supply for the projector 2B while keeping the projector 2A in the abnormal standby state.

When detecting predetermined operation of the remote controllers 50A and 50B for shifting the projector 2B to the stop state other than the power supply operation, the control unit 231 notifies, by displaying a message using the display unit 240, that the projector 2B is shifted to the stop state. Consequently, it is possible to inform the user of operation for shifting the projector 2B to a power-off (power supply stop) state in the limited operation mode and realize improvement of usability.

When determining, in starting projection, that the operation state of the other projector 2A is not the normal operation state, for example, when the startup of the projection system 1 is not completed, the control unit 231 shifts the projector 2B to the abnormal stop mode. Consequently, it is possible to prevent the projector 2B from shifting to the limited operation mode, for example, when an abnormality occurs during the initializing operation at the startup and initialization is not finished or when synchronization of the projector 2A and the projector 2B is not completed.

The embodiment is only an example of a specific form to which the invention is applied and does not limit the invention. The invention can also be applied as a form different from the embodiment. For example, in the example explained in the embodiment, the projectors 2A and 2B and the image output apparatus 7 are connected by wire via the image transmission cable 41. However, a connection form of the projectors 2A and 2B and the external output apparatus 7 is arbitrary. For example, the projectors 2A and 2B and the image output apparatus 7 may be connected to each other by wireless communication employing a wireless LAN, Bluetooth (registered trademark), or the like or by wired communication employing a general-purpose data communication cable such as USB, a wired LAN, or the like and transmit and receive data each other. The projectors 2A and 2B are connected to each other by wireless communication employing a wireless LAN, Bluetooth (registered trademark), or the like or by wired communication employing a general-purpose data communication cable such as USB, a wired LAN, or the like. However, a specific connection form is arbitrary as long as control information can be transmitted and received.

The functional units of the projectors 2A and 2B shown in FIG. 2 include functional configurations realized by cooperation of hardware and software. Specific implementation modes of the functional units are not specifically limited. Besides, specific detailed configurations of the units of the projection system 1 including the projectors 2A and 2B and the image output apparatus 7 can be arbitrarily changed without departing from the spirit of the invention.

What is claimed is:

1. A projector that performs projection in cooperation with an other projector, the projector comprising:
a determining unit configured to determine an operation state of the other projector;
a control unit configured to control the projector to shift to a limited operation mode for limiting execution of a function when the determining unit determines that the operation state of the other projector is not a normal operation state, and control the projector to shift to a sub-operation mode when the determining unit determines that the operation state of the other projector is the normal operation state; and
an operation detecting unit configured to detect operation by a remote controller,
wherein in the sub-operation mode, even if the operation detecting unit detects the operation by the remote controller, the projector does not independently execute a function according to the operation.

2. The projector according to claim 1, wherein the control unit limits, in the limited operation mode, execution of a function that requires a projection state of the projector to be consistent with a projection state of the other projector.

3. The projector according to claim 1, wherein the control unit changes, in the limited operation mode, the function to be executed according to the operation by the remote controller to a function different from a function in the sub-operation mode.

4. The projector according to claim 1, wherein, in the limited operation mode, the control unit controls the projector to shift to a stop state when the operation detecting unit detects predetermined operation of the remote controller other than power supply operation.

5. The projector according to claim 4, further comprising a notifying unit configured to generate a notification of the shift to the stop state when the operation detecting unit detects the predetermined operation of the remote controller.

6. The projector according to claim 1, wherein the control unit shifts to a stop state when, at a start of projection, the determining unit determines that the operation state of the other projector is not the normal operation state.

7. A control method for a projector for controlling the projector to execute projection in cooperation with an other projector, the control method comprising:
   determining an operation state of the other projector;
   shifting to, when it is determined that the operation state of the other projector is not a normal operation state, a limited operation mode for limiting execution of a function;
   shifting to a sub-operation mode when it is determined that the operation state of the other projector is the normal operation state;
   detecting an operation by a remote controller; and
   causing, in the sub-operation mode, the projector not to independently execute a function according to the operation even if the operation by the remote controller is detected.

8. The control method according to claim 7, wherein, in the limited operation mode, execution of a function that requires a projection state of the projector to be consistent with a projection state of the other projector is limited.

9. The control method according to claim 7, further comprising:
   changing, in the limited operation mode, the function to be executed according to the operation by the remote controller to a function different from a function in the sub-operation mode.

10. The control method according to claim 7, further comprising:
    shifting, in the limited operation mode, to a stop state when predetermined operation of the remote controller other than power supply operation is detected.

11. The control method according to claim 10, further comprising:
    generating a notification of the shift to the stop state when the predetermined operation of the remote controller is detected.

12. The control method according to claim 7, further comprising:
    shifting to a stop state when, at a start of projection, it is determined that the operation state of the other projector is not the normal operation state.

13. A projector that performs projection in cooperation with an other projector, the projector comprising:
    a determining unit configured to determine an operation state of the other projector; and
    a control unit configured to control the projector to shift to, when the determining unit determines that the operation state of the other projector is an abnormal standby state, a limited operation mode for limiting execution of a function.

14. The projector according to claim 13, wherein the control unit limits, in the limited operation mode, execution of a function that requires a projection state of the projector to be consistent with a projection state of the other projector.

15. The projector according to claim 13, wherein the control unit shifts to a stop state when, at a start of projection, the determining unit determines that the operation state of the other projector is an abnormal standby state.

* * * * *